US012753735B2

(12) United States Patent
McElroy

(10) Patent No.: US 12,753,735 B2
(45) Date of Patent: Oct. 6, 2026

(54) SUBMERSIBLE HYDROELECTRIC GENERATOR APPARATUS AND METHOD OF OPERATING SAME

(71) Applicant: Static Hydro Energy (S.H.E.) Limited, Dublin (IE)

(72) Inventor: Owen McElroy, Swords (IE)

(73) Assignee: Static Hydro Energy (S.H.E.) Limited, Dublin (IE)

( * ) Notice: Subject to any disclaimer, the term of this patent is extended or adjusted under 35 U.S.C. 154(b) by 0 days.

(21) Appl. No.: 18/995,352

(22) PCT Filed: Aug. 9, 2022

(86) PCT No.: PCT/EP2022/072370
§ 371 (c)(1),
(2) Date: Jan. 16, 2025

(87) PCT Pub. No.: WO2024/032878
PCT Pub. Date: Feb. 15, 2024

(65) Prior Publication Data

US 2026/0015988 A1 Jan. 15, 2026

(51) Int. Cl.
*F03B 13/10* (2006.01)
*H02K 7/18* (2006.01)

(52) U.S. Cl.
CPC ........... *F03B 13/10* (2013.01); *H02K 7/1823* (2013.01)

(58) Field of Classification Search
CPC .............................. F03B 13/10; H02K 7/1823
See application file for complete search history.

(56) References Cited

U.S. PATENT DOCUMENTS 4,873,450 A 10/1989 Quaintance
2011/0260460 A1 10/2011 Rovinsky

FOREIGN PATENT DOCUMENTS

EP 3693568 A1 * 8/2020 ............ F03B 17/005
JP 2005023799 A 1/2005
WO WO-2014180995 A1 * 11/2014 ............ F03B 17/005

OTHER PUBLICATIONS

PCT International Search Report and Written Opinion, Application No. PCT/EP2022/072370, dated Mar. 16, 2023.

* cited by examiner

*Primary Examiner* — Viet P Nguyen
(74) *Attorney, Agent, or Firm* — MacMillan, Sobanski & Todd, LLC

(57) ABSTRACT

This invention relates to a submersible hydroelectric generator apparatus (1) comprising a substantially upright body having an outer chamber (9) and an inner pressure chamber (7). The inner pressure chamber (9) has a pressurizable fluid supply therein and the outer chamber (9) has a charging inlet (21) adjacent the top of the upright body, a discharge outlet (11) located adjacent the bottom of the upright body, and a liquid passageway having a turbine (25) mounted therein and a flow regulator (27). An auxiliary pressurized fluid supply is provided to supplement the pressurizable fluid supply. A pressure regulator is provided, operable to control the delivery of auxiliary pressurized fluid from the auxiliary supply to the inner pressure chamber to maintain the pressure of the pressurizable fluid supply at or above a predetermined pressure level during evacuation of water from the apparatus. In this way, water will be expelled from the apparatus in a fast, repeatable manner.

16 Claims, 10 Drawing Sheets

SUBMERSIBLE HYDROELECTRIC GENERATOR APPARATUS AND METHOD OF OPERATING SAME

TECHNICAL FIELD

This invention relates to a submersible hydroelectric generator apparatus and a method of operating such an apparatus. The invention further relates to the use of excess or waste pressurised air from an existing process to generate electricity in such an apparatus.

BACKGROUND ART

For many years now, there has been a trend away from the use of fossil fuels and towards renewable energy supplies for electricity generation. One form of renewable energy supply that is becoming increasingly popular and attracting more attention is hydroelectric power generation that uses underwater "waterfalls" to generate the electricity. Generally speaking, these devices comprise a generator with a turbine that is submerged under the water. Water from above is dropped onto the turbine causing the turbine to rotate and this movement is translated into electricity.

One apparatus for harnessing this energy and producing electricity is described in US patent application no. US2009/0230687 in the name of Robichaud, hereinafter referred to simply as Robichaud. Another apparatus for harnessing this energy and producing electricity is described in US patent application no. US2011/0260460 in the name of Rovinsky, hereinafter referred to as Rovinsky.

One common problem of all these devices is how to efficiently evacuate water that has passed over the turbine from the apparatus. If the water is allowed to dwell or build up in the apparatus, the turbine will eventually become flooded and will no longer rotate. Indeed, Rovinsky specifically mentions this as a problem of the corkscrew arrangement used to evacuate water from the apparatus disclosed in Robichaud. Rovinsky states that the corkscrew arrangement of Robichaud will be insufficient to remove the water from below the turbine. Rovinsky discloses several different arrangements for evacuating water from the apparatus.

In an effort to address some of the shortcomings of the known apparatus and methods, Applicant developed their own submersible hydroelectric generator apparatus and method of operating such an apparatus. The resulting apparatus and method are described in detail in Applicant's own Patent Co-operation Treaty Patent Application Publication No. WO2014/180995, now also granted in several jurisdictions including under, inter alia, European Patent No. EP2994635, U.S. Pat. No. 10,641,236 and Chinese Patent No. CN105408622. Although understood to be a substantial advance on many alternative offerings, there is a continual desire to improve upon the Applicant's own patented apparatus and method.

It is an object of the present invention to provide a submersible hydroelectric generator apparatus and method of operating same that overcomes at least some of the problems with the known prior art. More specifically, it is an object of the invention to provide an apparatus and method that can more effectively evacuate water from the apparatus. It is a further still object of the present invention to provide a useful choice for the consumer.

SUMMARY OF INVENTION

According to the invention there is provided a submersible hydroelectric generator apparatus comprising a substantially upright body having an outer chamber and an inner pressure chamber surrounded by and spaced apart from the outer chamber, the inner pressure chamber being in fluid communication with the outer chamber adjacent the lowermost end of the inner pressure chamber, the inner pressure chamber having a pressurizable fluid supply therein, the outer chamber having a charging inlet adjacent the top of the upright body, a discharge outlet located adjacent the bottom of the upright body, and a liquid passageway intermediate the charging inlet and the discharge outlet, the liquid passageway having a turbine mounted therein and a flow regulator in the liquid passageway intermediate the turbine and the discharge outlet, and in which there is provided a closure moveable to and from a first position blocking the discharge outlet thereby preventing evacuation of water from the apparatus and a second position opening the discharge outlet thereby permitting evacuation of water from the apparatus, a controller, a closure actuator capable of moving the closure to and from the first position to and from the second position in response to a control input from the controller, a pressure sensor in the inner pressure chamber in communication with the controller, the pressure sensor being operable to measure the pressure of the pressurizable fluid supply in the inner pressure chamber, an auxiliary pressurized fluid supply to supplement the pressurizable fluid supply, characterized in that there is further provided a pressure regulator responsive to the controller, the pressure regulator being operable to control the delivery of auxiliary pressurized fluid from the auxiliary pressurized fluid supply to the inner pressure chamber to maintain the pressure of the pressurizable fluid supply in the inner pressure chamber at or above a predetermined pressure level during evacuation of water from the apparatus.

By having such an apparatus, the evacuation of water from the apparatus is faster and more efficient that was heretofore believed to be the case. It has been found that in order to provide a reliable, working device, it is important to have accurate and precise timing of the various components and steps. By using the auxiliary pressurized fluid supply in this manner to keep the pressurizable fluid supply at a substantially even pressure throughout the evacuation of the water, the function of the apparatus becomes more predictable and reliable, leading to an improved apparatus for the generation of electricity.

In one embodiment of the invention there is provided a submersible hydroelectric generator apparatus in which there is provided a compressor to provide the auxiliary pressurized fluid supply. By having a compressor, the desired auxiliary pressurized fluid supply may be provided whenever it is required.

In one embodiment of the invention there is provided a submersible hydroelectric generator apparatus in which the auxiliary pressurized fluid supply comprises air supplied from an existing process located remotely from the apparatus. Preferably, the auxiliary pressurized fluid supply comprises idle time air supplied from the existing process. This is seen as a particularly preferred aspect of the present invention. In this way, pressurized air that is otherwise going to waste, or is not being used in another process, may be put to good use in the generation of electricity. The idle time air would otherwise not be used and this is a simple and inexpensive way to generate electricity.

In one embodiment of the invention there is provided a submersible hydroelectric generator apparatus in which there is provided a tank located remotely from the submersible hydroelectric generator at the location of the existing process for storage of the auxiliary pressurized fluid supply, and a feed line extending from the tank to the submersible hydroelectric generator apparatus for delivery of the auxiliary pressurized fluid supply to the submersible hydroelectric generator apparatus. Again, this is seen as a useful aspect of the present invention. during idle time, the pressurized air is not required in the factory, manufacturing facility or other location where there is a supply of pressurized air. Instead of going to waste, the pressurized air may be syphoned off to a storage tank from where it can be delivered along a feed line to the submerged hydroelectric generator apparatus. by having a storage tank located adjacent to the existing process, a large store of pressurized air may be held in reserve for use in the apparatus according to the present invention.

In one embodiment of the invention there is provided a submersible hydroelectric generator apparatus in which the pressure regulator is operable to maintain the pressure of the pressurizable fluid supply in the inner pressure chamber at or above 1.8 bar.

This is seen as a particularly advantageous aspect of the present invention. Many of the existing offerings require very high pressures in order to operate, in some cases of the order of 7 bar to 10 bar. This in turn leads to an apparatus that must be highly reinforced in order to withstand the high pressures, and also to an apparatus that is relatively loud in operation. By operating at the lower pressure, it is possible to evacuate the water from the apparatus efficiently yet at the same time it is possible to provide a device that is lighter, requires less resources and is quieter. In this way, the apparatus is suitable for installation in inhabited areas such as, but not limited to, a hotel, office, stadium, factory, shopping centre, apartment building or other complex.

In one embodiment of the invention there is provided a submersible hydroelectric generator apparatus in which the pressure regulator is operable to maintain the pressure of the pressurizable fluid supply in the inner pressure chamber at or above 2.0 bar.

In one embodiment of the invention there is provided a submersible hydroelectric generator apparatus in which the pressure regulator is operable to maintain the pressure of the pressurizable fluid supply in the inner pressure chamber below 3.0 bar.

In one embodiment of the invention there is provided a submersible hydroelectric generator apparatus in which the flow regulator comprises a sump located in the liquid passageway below the turbine and in which there is provided means to seal the sump.

In one embodiment of the invention there is provided a submersible hydroelectric generator apparatus in which there is provided means to draw air from the sump thereby creating a vacuum in the sump. By evacuating the air from the sump while the water is being evacuated from the apparatus, it is possible to fill the sump quicker than would otherwise be the case. if water has been prevented from flowing into the apparatus, once the water is allowed to flow into the apparatus once more, it will do so quickly, passing quickly over the generator causing the generator to operate effectively.

In one embodiment of the invention there is provided a submersible hydroelectric generator apparatus in which there is provided a release valve in the inner pressure chamber to allow evacuation of at least some of the pressurizable fluid supply from the inner chamber. In this way, it will be possible to ease the flow of water into the inner pressure chamber and provide a more reliable apparatus that is more predictable in operation.

In one embodiment of the invention there is provided a submersible hydroelectric generator apparatus in which there is provided a tank connected to the release valve to receive the pressurizable fluid supply evacuated from the inner pressure chamber. By having a tank connected to the release valve, the air from the inner pressure chamber can be pressurized and recycled rather than being bled off to atmosphere.

In one embodiment of the invention there is provided a method of evacuating water from a submersible hydroelectric generator apparatus of the type claimed, comprising the steps of: providing an auxiliary pressurized fluid supply to supplement the pressurizable fluid supply in the inner pressure chamber and, during evacuation of water from the apparatus, controlling the delivery of auxiliary pressurized fluid from the auxiliary pressurized fluid supply to the inner pressure chamber to maintain the pressure of the pressurizable fluid supply in the inner pressure chamber at or above a predetermined pressure level.

This is seen as a very effective method for evacuating water from a submersible hydroelectric generator apparatus. By using the method, the evacuation of water from the apparatus is faster and more efficient that was heretofore believed to be the case. It has been found that in order to provide a reliable, working device, it is important to have accurate and precise timing of the various steps of the method. By using the auxiliary pressurized fluid supply in this manner to keep the pressurizable fluid supply at a substantially even pressure throughout the evacuation of the water, the method becomes more predictable and reliable, leading to an improved apparatus for the generation of electricity.

In one embodiment of the invention there is provided a method comprising the step of maintaining the pressure of the pressurizable fluid supply in the inner pressure chamber at or above 1.8 bar.

In one embodiment of the invention there is provided a method comprising the step of maintaining the pressure of the pressurizable fluid supply in the inner pressure chamber at or above 2.0 bar.

In one embodiment of the invention there is provided a method comprising the step of maintaining the pressure of the pressurizable fluid supply in the inner pressure chamber below 3.0 bar.

In one embodiment of the invention there is provided a method comprising the step of, when water is being discharged from the apparatus, limiting the flow of further incoming water through the apparatus.

In one embodiment of the invention there is provided a method comprising the step of, when water is being discharged from the apparatus, sealing a sump located below the turbine.

In one embodiment of the invention there is provided a method comprising the step of, when water is being discharged from the apparatus, evacuating air from the sump, thereby creating a vacuum in the sump.

In one embodiment of the invention there is provided a method comprising the step of harvesting pressurized air from an existing process for use as the auxiliary pressurized fluid supply.

BRIEF DESCRIPTION OF THE DRAWINGS

The invention will now be more clearly understood from the following description of some embodiments thereof given by way of example only with reference to the accompanying drawings, in which.

DETAILED DESCRIPTION OF THE DRAWINGS

Figure 1:
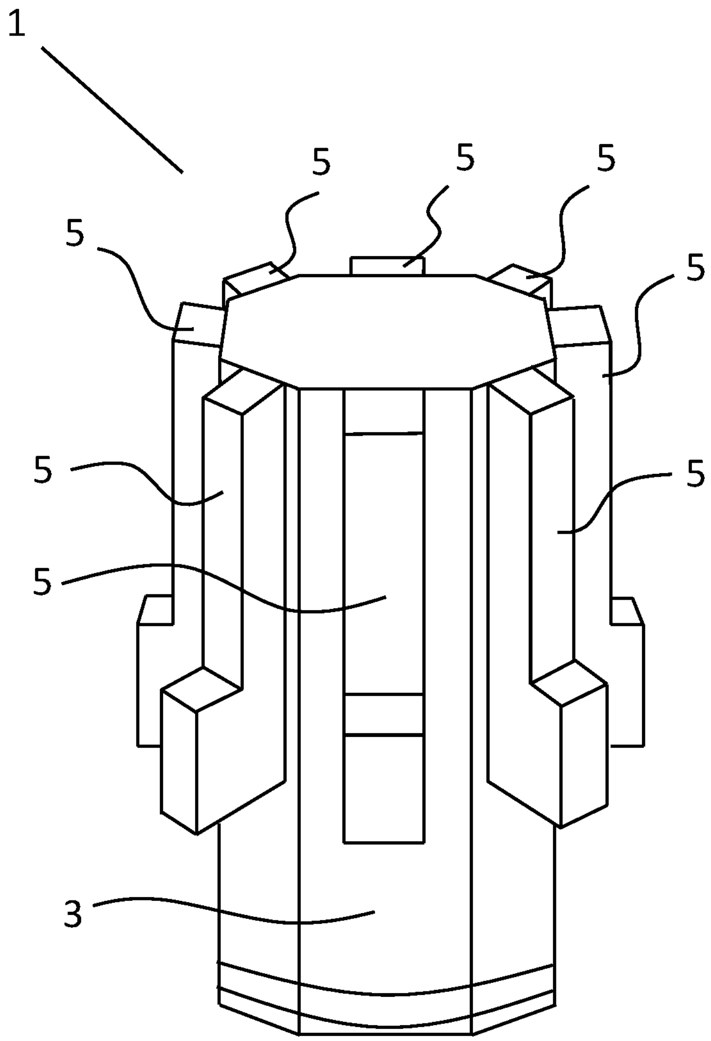
FIG. 1 is a perspective view of a submersible hydroelectric generator apparatus according to the invention.
Figure 2:
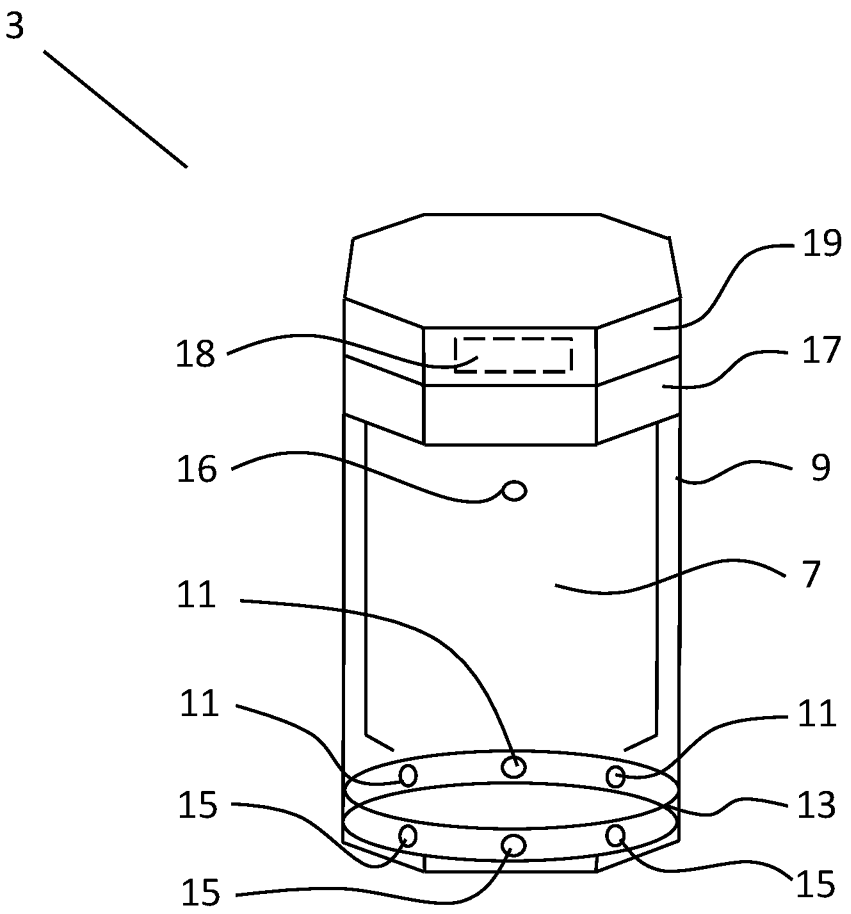
FIG. 2 is a perspective, part cross-sectional view of a first part of the submersible hydroelectric generator apparatus.
Figure 3:
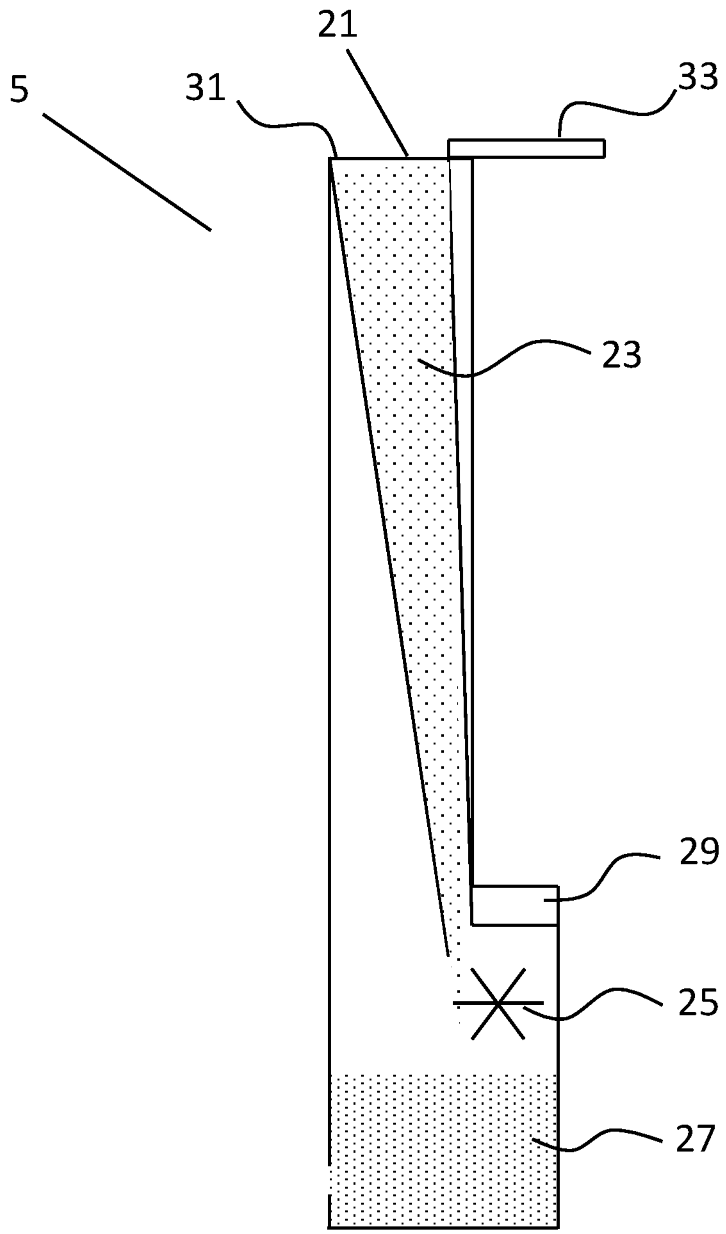
FIG. 3 is a side cross-sectional view of a second part of the submersible hydroelectric generator apparatus.

Referring to FIGS. 1 to 3, and initially specifically to FIG. 1, there is shown a submersible hydroelectric generator apparatus, indicated generally by the reference numeral 1, comprising a first part 3 and a second part 5 mounted on the first part. In the embodiment shown, the first part 3 is an octagonal cylinder and there are provided eight second parts 5, one on each side of the octagonal cylinder, mounted on the first part 3.

Referring specifically to FIG. 2, the first part comprises an inner pressure chamber 7 and an outer chamber 9 surrounding and spaced apart from the inner pressure chamber 7. There are provided a plurality of discharge apertures 11 located adjacent the base of the outer chamber 9 and a closure member, in this case provided by way of an annular ring 13. The annular ring 13 is rotatably mounted on the outer chamber 9 and has a plurality of apertures 15 formed therein. As the annular ring 13 is rotated around the outer chamber, the apertures 15 will align with the discharge apertures 11. Further rotation of the ring 13 or rotation of the ring 13 in the opposite direction will bring the apertures 15 out of alignment with the apertures 11 thereby closing off the discharge apertures 11. The portion of the first part on which the annular ring sits will be cylindrical in shape rather than octagonal in shape to allow rotation of the annular ring about the first part. The first part further comprises a compressed air tank 17 and a transformer and compressor compartment 19 above the inner pressure chamber 7. There is further shown a pressure sensor 16 located internal the inner pressure chamber and a pressure regulator 18 (shown in dashed outline) located in the transformer and compressor compartment 19.

In use, the pressure sensor 16 is operable to measure the pressure of the pressurizable fluid supply in the inner pressure chamber. An auxiliary pressurized fluid supply (provided in this instance by a compressor in the transformer and compressor compartment 19) is provided to supplement the pressurizable fluid supply in the inner pressure chamber. The pressure regulator 18 is operable to control the delivery of auxiliary pressurized fluid from the auxiliary pressurized fluid supply to the inner pressure chamber 7 to maintain the pressure of the pressurizable fluid supply in the inner pressure chamber at or above a predetermined pressure level during evacuation of water from the apparatus (as will be described in more detail below).

Referring specifically to FIG. 3, the second part 5 comprises a charging aperture 21 and a liquid passageway 23 internal the second part 5. A turbine 25 is mounted in the liquid passageway 23 and there is provided a sump 27 below and spaced apart from the turbine in the liquid passageway for collecting water coming down the liquid passageway 23 over the turbine 25. The second part comprises a generator/alternator compartment 29 with a generator/alternator (not shown) therein in communication with the turbine 25 to transform the rotational movement of the turbine 25 into electricity. The charging aperture 21 is preferably provided with an intake grill 31 to prevent large foreign objects entering into the liquid passageway and there is provided a closure 33 for the charging aperture 21 that may be moved over the charging aperture to prevent intake of water into the liquid passageway.

Figure 4:
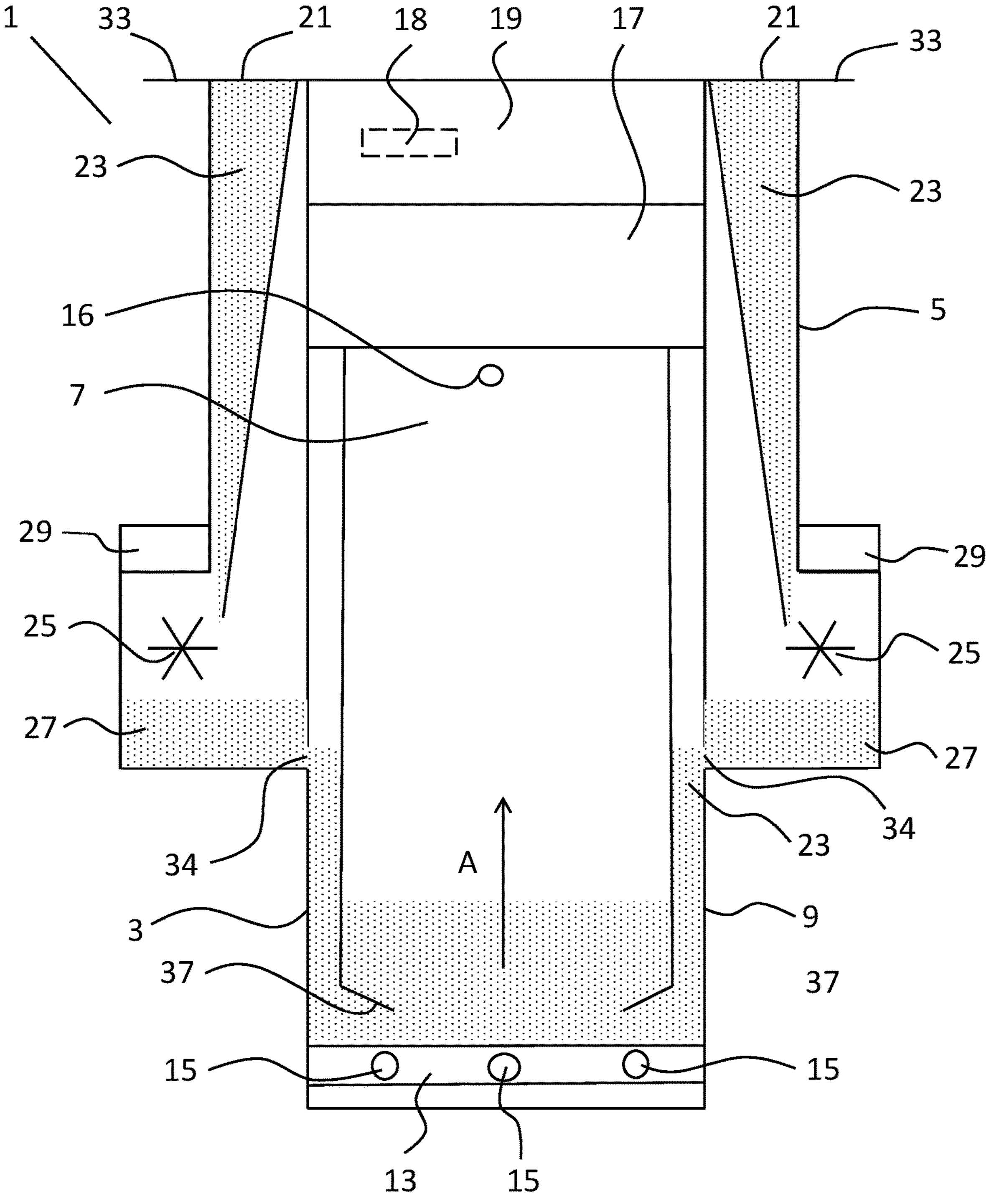
FIGS. 4 to 7 inclusive are side cross-sectional views of the submersible hydroelectric generator apparatus during operation.

Referring to FIGS. 4 to 7 inclusive, there is shown a plurality of views of the submersible hydroelectric generator apparatus 1 according to the invention in operation. Referring first of all to FIG. 4, it can be seen that when the first part 3 and the second part 5 are joined together, the liquid passageway 23 is not located solely in the second part 5 but instead the liquid passageway 23 extends all the way from the charging inlet 21 at the top of the second part (which may be considered for the purposes of this specification as the top of the outer chamber 9) down through the second part 5 and into the first part 3 via complementary linking apertures 34 in the first and second parts. The incoming water flows between the outer chamber 9 and the inner pressure chamber 7 down to the discharge apertures 11 at the base of the outer chamber 9 of the first part 3.

In use, in FIG. 4, the charging inlet 21 is open and is submerged below the surface of the body of water in which the submersible hydroelectric generator apparatus is submerged. Water flows into the apparatus through the charging inlet 21 and travels down over a cascade through the liquid passageway 23 and impacts on the turbine 25. This causes the turbine to rotate. The rotational movement of the turbine will be converted into electricity in the generator/alternator housed in the generator/alternator compartment 29 and from there will be passed to the transformer and/or the compressor in the transformer and compressor compartment 19. The water that has passed by the turbine continues to travel through the liquid passageway 23 into the sump 27 and from there will pass through the linking apertures 34 downward through the liquid passageway in the gap between the inner pressure chamber 7 and the outer chamber 9 towards the bottom of the outer chamber 9. The annular ring 13 has been rotated so that the apertures 15 in the annular ring 13 are not aligned with the discharge apertures 11 in the outer chamber and therefore the water cannot escape from the outer chamber.

The outer chamber 9 and the inner pressure chamber 7 are in fluid communication with each other. Effectively, the inner pressure chamber 7 is open at the base and the water entering through the liquid passageway will gather in the bottom of the outer chamber 9 and start to rise up through the inner pressure chamber 7 as indicated by arrow A in FIG. 4. There is a pressurizable fluid supply, indicated by the reference numeral 35, in the inner pressure chamber 7. As the water rises up in the inner pressure chamber 7, the volume of fluid of the pressurizable fluid supply 35, in this case a gas, preferably air, will decrease. As the volume decreases, the pressure on the gas of the pressurizable fluid supply will increase.

Figure 5:
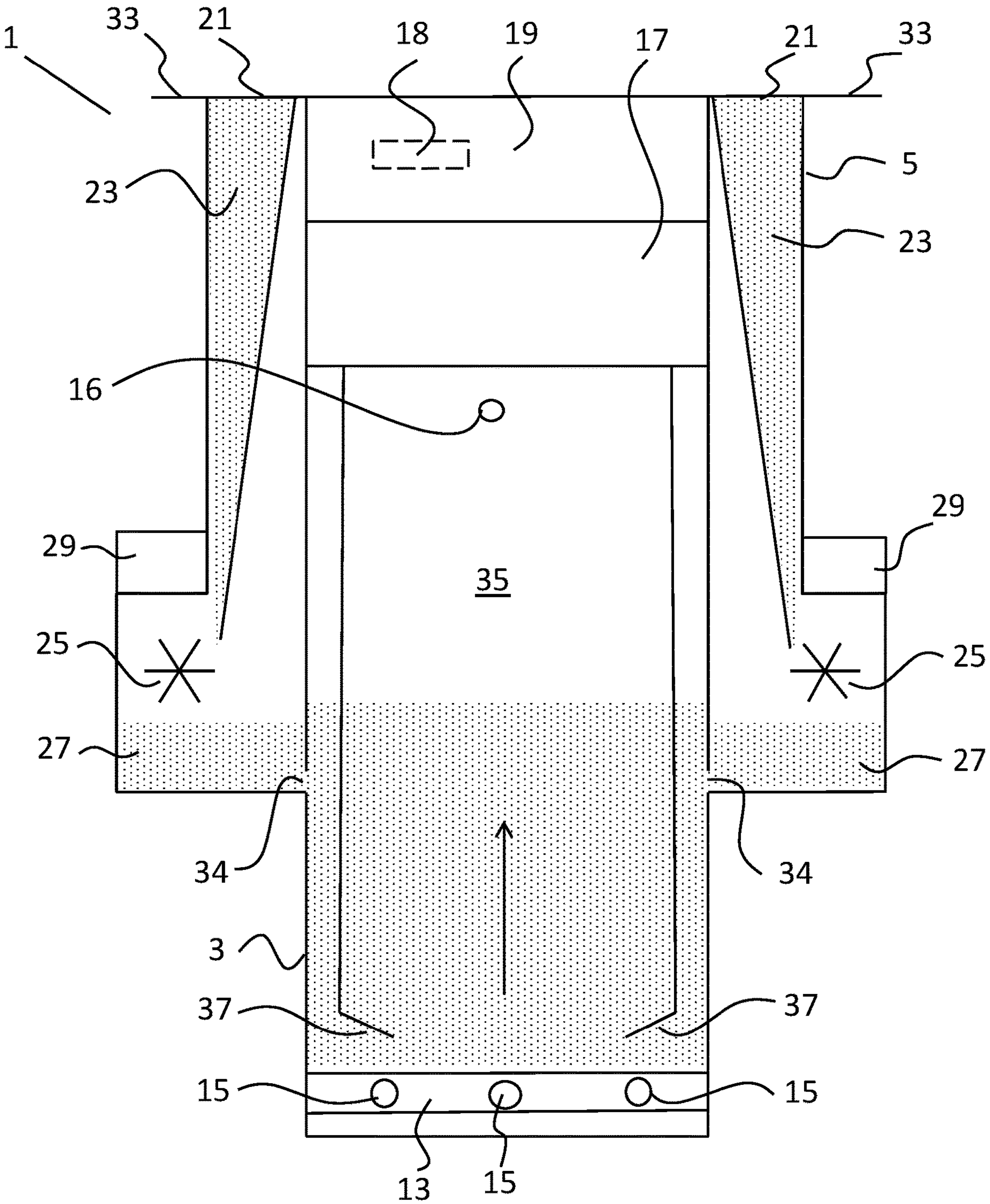

Referring specifically to FIG. 5, the level of water in the inner pressure chamber 7 has risen further thereby further decreasing the volume of gas. It will be understood that as the gas is trapped in the inner pressure chamber 7, the pressure of the gas of the pressurizable fluid supply 35 will be greater than that shown in FIG. 4. In FIG. 5, additional gas from an auxiliary pressurized fluid supply 17 is added to the pressurizable fluid supply 35 thereby further increasing the pressure of the pressurizable fluid supply 35 in the inner pressure chamber 7.

Figure 6:
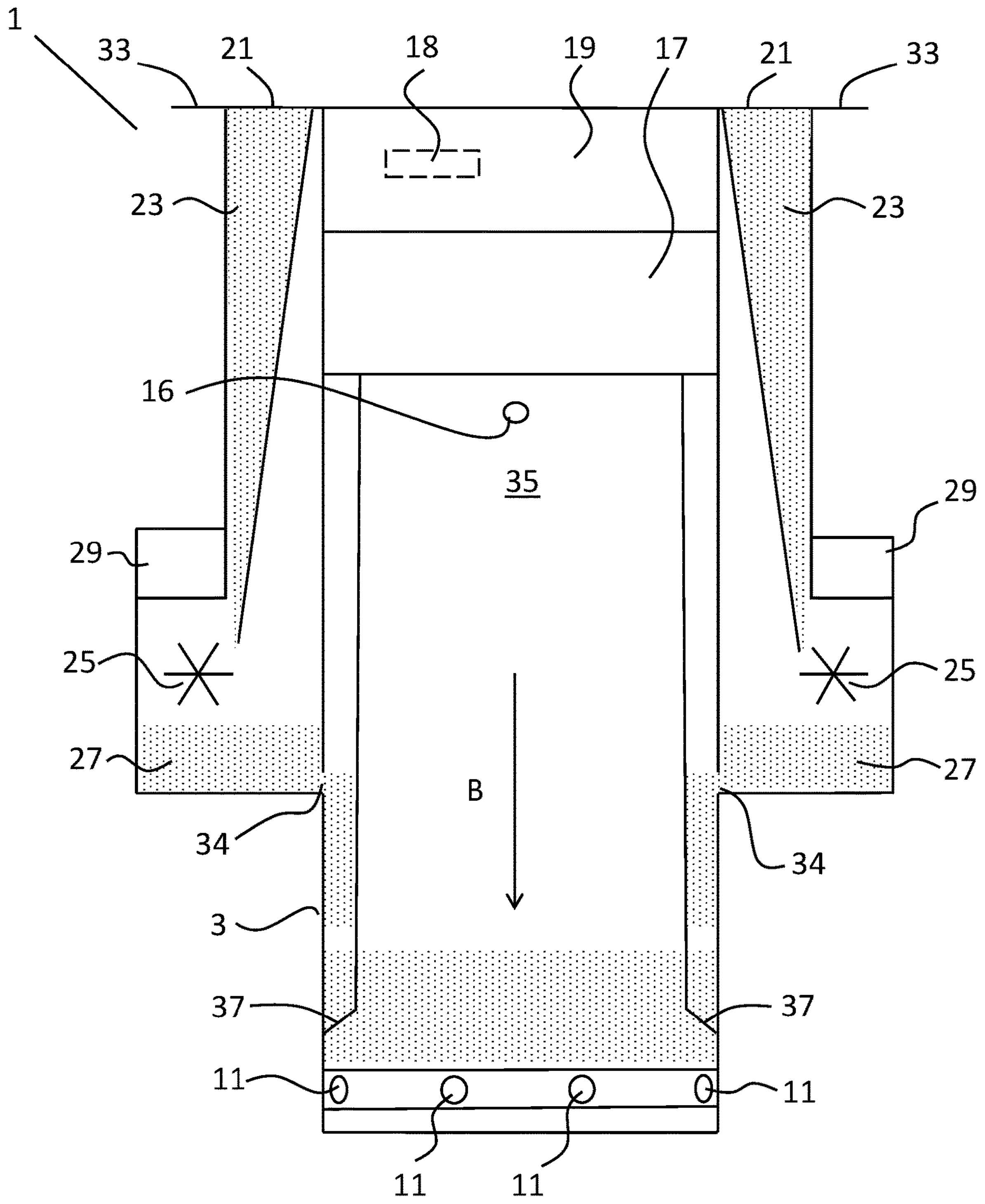

A pressure sensor 16 monitors the pressure of the pressurizable fluid supply 35. When the pressure of the pressurizable fluid supply 35 reaches a level sufficient to evacuate the water from the apparatus 1 (i.e. when the pressure exceeds the hydrostatic pressure of the water outside the apparatus), a flow regulator, in this case a valve 37 in the liquid passageway 23, is closed as illustrated in FIG. 6. The valve 37 was previously open (as illustrated in FIGS. 4 and 5), or free of the liquid passageway to allow throughpassage of water through the liquid passageway 23, however in the configuration shown in FIG. 6 the valve is closed and is blocking the liquid passageway 23. When the valve is closed, the annular ring 13 is rotated to bring the apertures 15 therein into alignment with the discharge apertures 11. Once the apertures 15 in the annular ring 13 are in alignment with the discharge apertures 11, the pressurized fluid supply 35 will cause the water in the inner chamber to be expelled from the apparatus through the discharge apertures 11, as illustrated by the arrow “B” in FIG. 6. It is envisaged that not all of the water will be discharged from the apparatus to avoid loss of pressurizable fluid supply however a significant portion of the water will be evacuated from the apparatus.

Importantly, as the water is being expelled from the apparatus, the pressure regulator 18, responsive to the controller, will operate to control the delivery of auxiliary pressurized fluid from the auxiliary pressurized fluid supply 17 to the inner pressure chamber 7 to maintain the pressure of the pressurizable fluid supply in the inner pressure chamber 7 at or above a predetermined pressure level during evacuation of water from the apparatus. Effectively, the pressure regulator will compensate for the loss of water from the inner chamber and the expansion of the gas inside the inner pressure chamber to maintain the pressure of the pressurizable fluid supply 35 at or around 2.0 bar. Preferably, the pressure is kept at a pressure level in excess of 1.8 bar and less than 3.0 bar.

Figure 7:
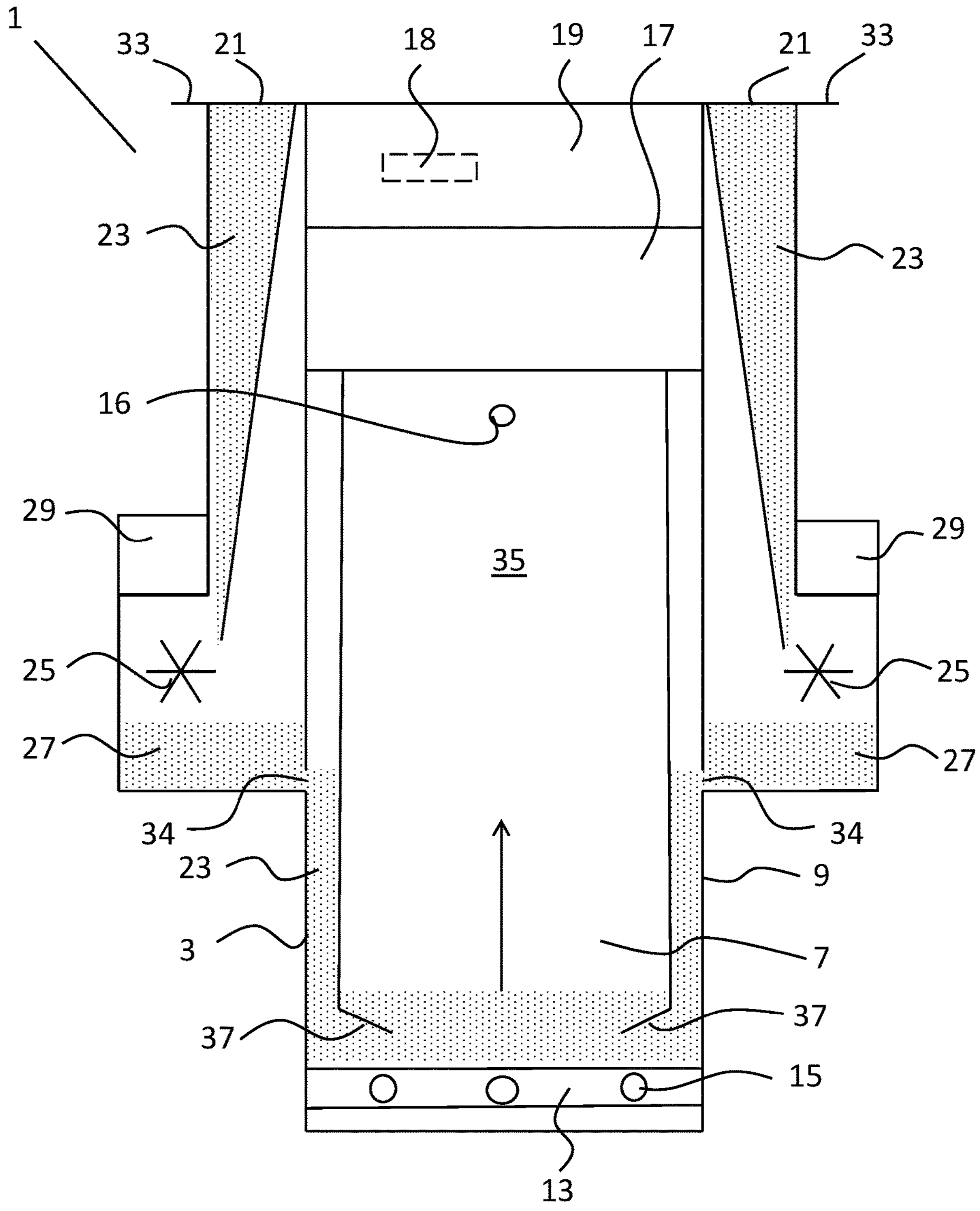

Referring to FIG. 7, when the water has been evacuated from the apparatus 1, the annular ring 13 is rotated once more either in the same direction or in the opposite direction in order to bring the apertures 15 and the discharge apertures 11 out of alignment thereby closing the discharge apertures 11 once more. The flow regulators 37 are returned to their open configuration thereby allowing flow of water down through the liquid passageway 23 and into the inner pressure chamber 7 once more where it will begin to pressurize the pressurizable fluid supply 35 in the inner pressure chamber 7 once more. It is envisaged that the pressurizable fluid supply 35 may be vented to prevent a substantial increase in the pressurizable fluid supply 35 pressure so that it is maintained at or just above a given level.

It will be understood that when the valve 37 is closed, as illustrated in FIG. 6, the water flowing through the liquid passageway 23 will back up behind the valve 37 and may begin to fill up the sump 27. As soon as the valves 37 are opened once more (as illustrated in FIG. 7), the water built up behind the valve 37 and the water in the sump 27 will flow quickly past the valve 37 and into the inner pressure chamber 7. The timing of the valve’s 37 and the annular ring’s 13 operation, the amount of additional pressure applied, and the dimensions of the liquid passageway 23 and the sump 27 are chosen so that the turbine 25 is not flooded while the valves 37 are closed and the water is being evacuated from the apparatus 1. As an alternative or in addition to this, closures 33 could be provided to temporarily close or narrow the charging inlets 21 to reduce intake of water while water is being evacuated from the apparatus.

Figure 8:
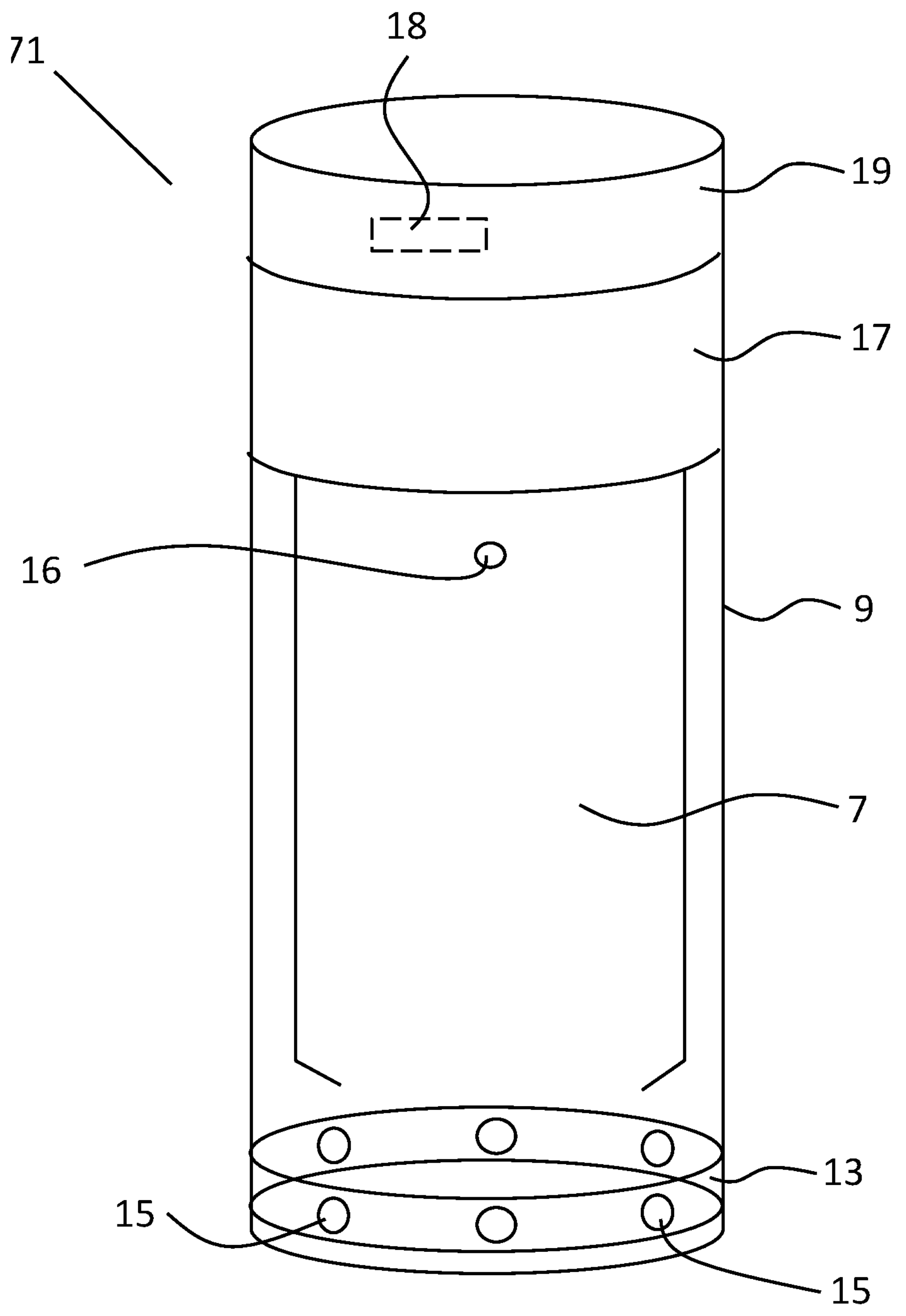
FIG. 8 is a perspective, part cross-sectional view of an alternative embodiment of the first part of the submersible hydroelectric generator apparatus.

Referring now to FIG. 8, there is shown an alternative construction of the first part of the apparatus according to the present invention, indicated generally by the reference numeral 71, where like parts have been given the same reference numeral as before. The first part 71 differs from the previously illustrated first part 3 in that it is substantially cylindrical along its entire height and not simply at the position of the annular ring 13. The second parts 5 will be dimensioned appropriately so that they form a close fit with the curved cylindrical surface.

Figure 9:
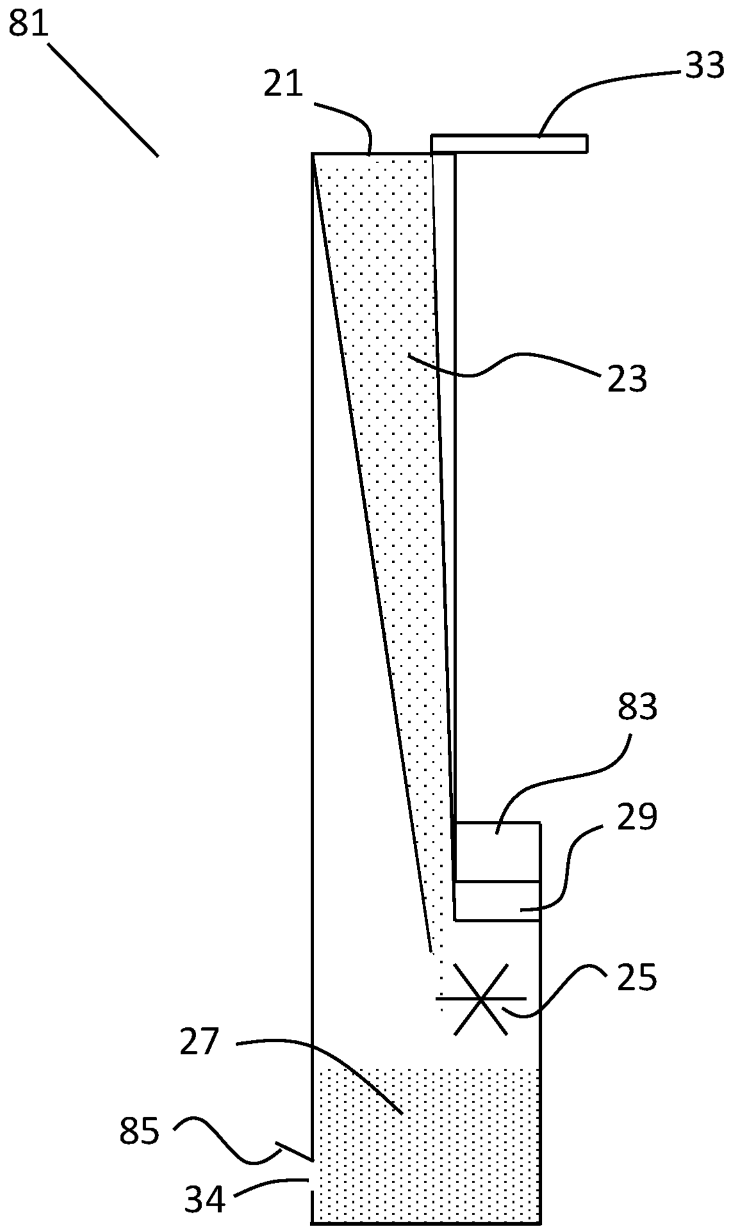
FIG. 9 is a perspective, part cross-sectional view of an alternative embodiment of the second part of the submersible hydroelectric generator apparatus.

Referring to FIG. 9, there is shown an alternative embodiment of the second part of the apparatus according to the invention, indicated generally by the reference numeral 81, where like parts have been given the same reference numeral as before. The second embodiment 81 of the second part of the apparatus differs from the previously described embodiment in that there is provided a vacuum pump, indicated generally by the reference numeral 83 mounted on the second part adjacent the sump. The purpose of the vacuum pump is to speed up the intake of water into the sump and to speed up the filling of the inner pressure chamber with water. While water is being expelled from the apparatus, the sump will be hermetically sealed using closures 33 and 85. The vacuum pump will then operate to evacuate the air from the sump 27. Once the water has been evacuated from the inner pressure chamber of the apparatus, the closures 33 and 85 will be opened once more and the vacuum that now exists in the sump will cause an in-rush of water into the second part of the apparatus through the charging inlet 21.

It is envisaged that other pressure vessels located elsewhere may also be employed to equally good effect. For example, there may be a vacuum pressure vessel in communication with the interior of the inner pressure chamber that is operable to withdraw air or pressurizable fluid from the inner pressure chamber and encourage faster ingress of water into the inner pressure chamber due to the partial vacuum that thereafter exists in the inner pressure chamber.

Figure 10:
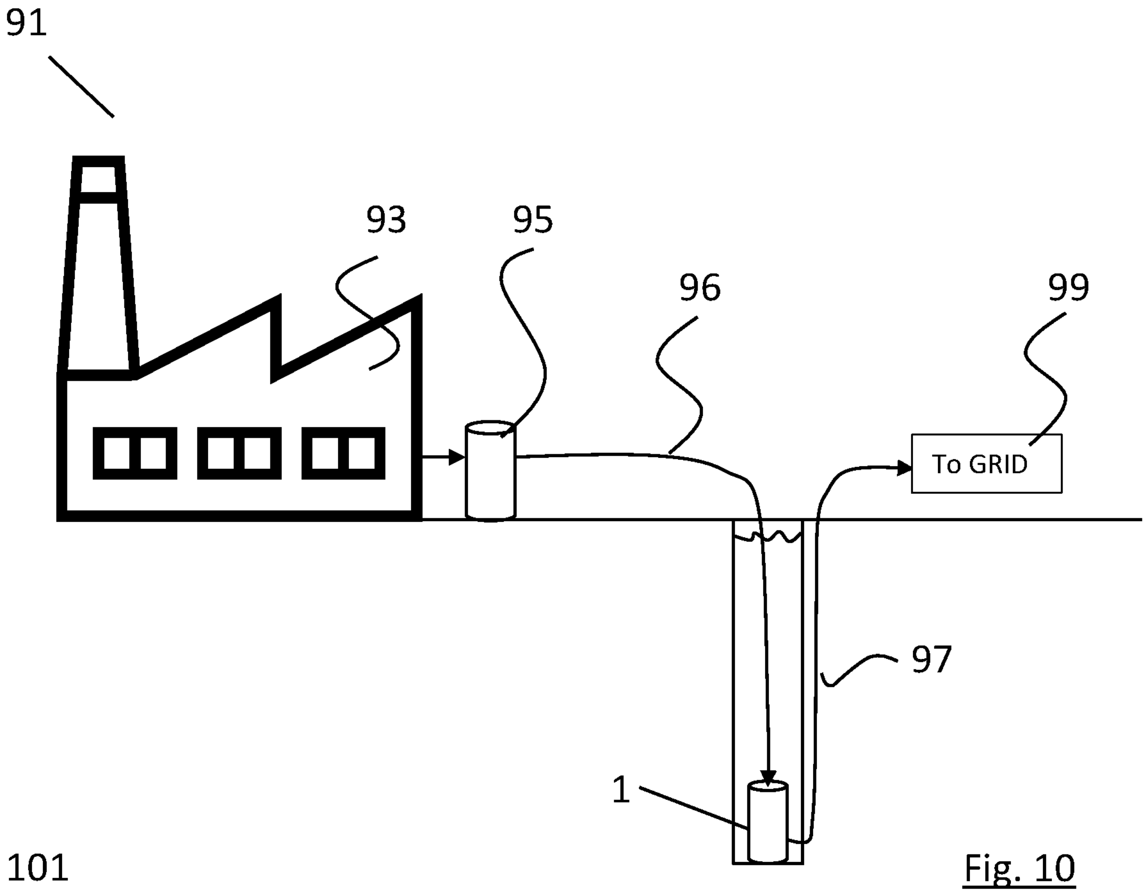
FIG. 10 is a diagrammatic representation of a system incorporating the submersible hydroelectric generator apparatus according to the invention.

Referring now to FIG. 10, there is shown a diagrammatic representation of a system, indicated generally by the reference numeral 91, in which the apparatus and method according to the invention may be carried out. The system 91 comprises a factory 93 which has an air compressor (not shown). Air compressors are a common feature in many factories and are widely used in manufacturing. A pressurized air tank 95 is located at the factory and when the air compressors are idle, the idle time air from the air compressor is siphoned off to the pressurized air tank 95. The pressurized air is then delivered along feed line 96 to the remote submersible hydroelectric generator apparatus 1. In this case, the remote submersible hydroelectric generator apparatus 1 is shown in a dedicated well/chamber for housing the remote submersible hydroelectric generator apparatus 1. Instead, the remote submersible hydroelectric generator apparatus 1 could be located in a river, pond, lake, sea or ocean. There is a head of water of the order of at least 8 m above the turbines of the remote submersible hydroelectric generator apparatus 1. An electricity cable 97 is provided to deliver the electricity generated in the remote submersible hydroelectric generator apparatus 1 to an electricity grid 99.

In addition to the foregoing, it is envisaged that the present invention is also particularly suited for the usage of and effectively the storage of excess electricity produced for the electricity supply grid. In this way, the invention may be seen as a "green battery" whereby the excess electricity may be stored in a suitable form until it is required by the electricity grid. More specifically, when solar or wind farms in particular produce excess electricity, such as at periods of low demand or periods where the grid is unable to accept additional electricity that has been generated, there is a danger that the excess electricity will be dumped or shunted, leading to significant waste. However, it is envisaged that the excess electricity could instead be fed to a compressor and used to make compressed air to power the apparatus according to the invention. In other words, the remote source of compressed air could also be provided by way of a compressor powered using the excess electricity generated by one or more of a solar energy farm and/or a wind energy farm. Indeed, other sources of electricity generation, such as hydroelectric, wave, tidal or the like that produce excess electricity could also be used to provide electricity to the compressor to generate compressed air for use in the apparatus according to the invention.

Figure 11:
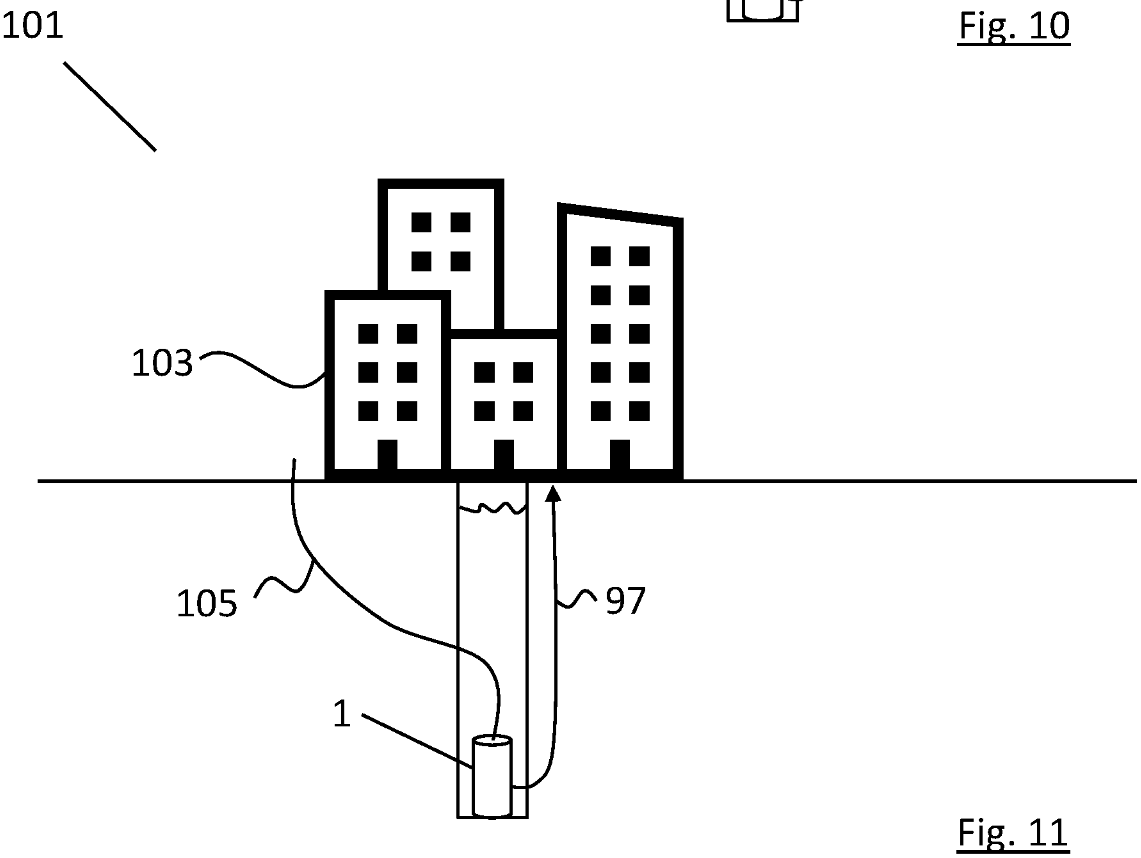
FIG. 11 is a diagrammatic representation of another system incorporating the submersible hydroelectric generator apparatus according to the invention.

Referring now to FIG. 11, there is shown a diagrammatic representation of a system, indicated generally by the reference numeral 101, in which the apparatus and method according to the invention may be carried out. The system 101 comprises a building complex 103, such as, but not limited to, a school, office complex or housing complex, that is supplied with electricity by the submersible hydroelectric generator apparatus 1 via cable 97. An air conduit/feed line 105 is provided to provide either uncompressed air supply for a compressor at the submersible hydroelectric generator apparatus 1 or to supply compressed air from an existing process. The existing process could be a manufacturing line or a compressor that operates preferably using a renewable energy generation supply such as a wind turbine or a solar panel array. What is important is that the building complex can be powered by electricity from the submersible hydroelectric generator apparatus 1. Again, the submersible hydroelectric generator apparatus 1 is shown underground in a dedicated flooded chamber however it could be located elsewhere with a head of water of the order of 8 m above the turbines. If the head height is increased, this will increase the efficiency of the submersible hydroelectric generator apparatus 1.

One advantage of the present invention over the existing offerings is its ability to remove the "dead" water from the machine in a speedy and efficient manner, as well as provide a reliable, repeatable performance. In the embodiments described, reference is made to providing an auxiliary pressurized fluid supply to supplement the pressurizable fluid supply. The speed at which the water is evacuated from the inner pressure chamber will be dependent in part on the pressure built up in the pressurizable fluid. As a general rule of thumb, the more pressure in the pressurizable fluid, the faster the expulsion of water from the inner pressure chamber and the more water that will be expelled from the inner pressure chamber. Therefore, the addition of pressurized fluid can be highly effective in ensuring that the water is expelled fast enough from the apparatus to avoid the turbines becoming flooded. In many cases, it has been calculated that the addition of one (1) bar of pressure to the pressurizable fluid will be sufficient to ensure sufficient evacuation of water from the apparatus. Indeed, if desired, the vast majority of the pressurizable fluid may be exhausted from the apparatus to facilitate quick filling of the inner pressure chamber with water and the pressurized fluid may then be sourced predominantly from the auxiliary pressurized fluid supply. In addition, by using the auxiliary pressurized fluid supply to maintain the pressure of the pressurizable fluid, the water will be evacuated in a relatively orderly, reliable manner.

The provision of one bar of additional pressure is relatively simple to achieve with a low cost and low electricity-using compressor. Indeed, it will be possible to provide more pressure if needed with higher rated compressors. According to the present invention, it is envisaged that if the pressurizable fluid supply is at 2.0 bar, and less than 3.0 bar, this will provide a very useful apparatus. If a system is provided in which the compressible fluid is exhausted from the device during filling of the inner pressure chamber with water, it will be necessary to provide a pressurizable fluid supply to the compressors. This could be achieved through a suitable conduit that extends upwardly from the apparatus to a position above the surface of the water in which the device is submerged.

The total electricity derived from the device may be carefully selected and will depend in part on the size of the apparatus, the efficiency of the turbines, the number of the turbines used and the force of the water travelling over the turbines (which in turn will depend in part on the head of water and the distance that the water falls to the turbine). It is envisaged that the apparatus will be immersed in a body of water and will have a depth of water in the region of eight (8) metres above the turbine. The formula for the velocity of the water passing through the cascade in the liquid passageway 23 and exiting the sump 27 is derived by balancing Newton's laws for kinetic and potential energy. The final equation is:

$$m \cdot v^2 = 2 \cdot m \cdot g \cdot H$$

where m is the mass of water, v is the velocity, g is the acceleration due to gravity and H is the height of water. The pressure exerted by the water in the inner pressure chamber 7 is determined by Newton's Second Law:

$$F = m \cdot a$$

where F is the force exerted by the water, m is the mass of water and a is the acceleration of the water. The pressure of the water is then calculated by:

$$P = F / A$$

where P is the pressure, Fis the force exerted by the water and A is the cross-sectional area. According to Pascal's Law, the pressure exerted on the air in the inner pressure chamber 7 of the first part 3 is equal to the pressure exerted by the water between the inner and outer walls for a non-compressible liquid and enclosed system. Water can, to a first approximation, be considered to be a non-compressible liquid and, because, when the water exits the sump 27 there is a constant flow of water, the system can be considered at least partially enclosed. The thrust of the water exiting the Central Plexus is given by $$F = 2 \cdot A\left[P - P_H\right]$$

where Fis the force, A is the cross-sectional area of the aperture, P is the pressure of the water and $P_H$ is the hydrostatic pressure of the outside water.

It will be understood that various modifications could be made to the apparatus described above without departing from the spirit of the invention or indeed the scope of the appended claims. For example, in the embodiment above, the apparatus is described as a two-part apparatus however it could be a single part or indeed more than two main parts. Furthermore, the apparatus casing is preferably constructed from a polymer material although other materials could be used as well as, or instead of, the polymer material. In the embodiments shown, there is always provided a compressor and a compressed air tank however these may not be necessary in some implementations and the compressed air supply may be provided from an existing manufacturing process. For example, in a particularly preferred embodiment of the present invention, the idle time air from an existing manufacturing process will be used as the auxiliary pressurized fluid supply. A compressor and or an additional pressure regulator may still be provided and used in the apparatus even when auxiliary pressurized fluid supply is provided by an existing process. These may be useful to regulate the incoming pressurized fluid supply or may be useful to ensure supply of the auxiliary pressurized fluid supply.

The apparatus will be connected up to an electricity distribution grid 99 which may be the national grid or indeed could be a connection to the supply of an individual building or ship 103. However, although the electrical connections have not been shown for clarity of the drawings, it will be understood that they will be provided. Furthermore, the features of the transformer, compressor and generator/alternator have not been shown as these are standard and would be well understood in the art. It is envisaged that the apparatus may be anchored to the sea bed (if installed in the sea) or could be embedded in the bottom of the body of water (lake, dedicated pool or pond) using pylons however the fixing means have not been shown as they are not relevant to the patentable aspects of the invention.

In the embodiment shown, the device is an octagonal cylinder in shape however it could be cylindrical, triangular, square, rectangular or other shape and it is not essential to have eight sides and eight turbines. The turbines shown are shown configured vertically about a horizontal axis however they could be configured horizontally or configured vertically but at right angles or a different angle to the orientation shown. In the embodiment shown, there are a plurality of charging inlets and a plurality of discharge outlets although this is not essential and there could be a single charging inlet and/or a single discharge outlet.

In the embodiment shown, the device is operated by sensing the pressure of the pressurizable fluid supply 35 before evacuating the water from the pressurizable fluid supply. However, in some embodiments, where the pressure is effectively constant, a float switch could be provided instead of, or in addition to, one or more pressure sensors to detect the level of the water in the inner pressure chamber. From that, it is possible to determine when the water can be and needs to be evacuated and furthermore one or more float sensors could also be used to determine when the water has been sufficiently evacuated from the inner pressure chamber. The apparatus and method could operate equally well in a static pool of water or in free flowing water.

In this specification the terms "comprise, comprises, comprised and comprising" and the terms "include, includes, included and including" are all deemed totally interchangeable and should be afforded the widest possible interpretation.

The invention is in no way limited to the embodiment hereinbefore described but may be varied in both construction and detail within the scope of the claims.

What is claimed is:

1. A submersible hydroelectric generator apparatus comprising:

a substantially upright body having an outer chamber and an inner pressure chamber surrounded by and spaced apart from the outer chamber, the inner pressure chamber being in fluid communication with the outer chamber adjacent the lowermost end of the inner pressure chamber, the inner pressure chamber having a pressurizable fluid supply therein, the outer chamber having a charging inlet adjacent the top of the upright body, a discharge outlet located adjacent the bottom of the upright body, and a liquid passageway intermediate the charging inlet and the discharge outlet, the liquid passageway having a turbine mounted therein and a flow regulator in the liquid passageway intermediate the turbine and the discharge outlet, and in which there is provided a closure moveable to and from a first position blocking the discharge outlet thereby preventing evacuation of water from the apparatus and a second position opening the discharge outlet thereby permitting evacuation of water from the apparatus, a controller, a closure actuator capable of moving the closure to and from the first position to and from the second position in response to a control input from the controller, a pressure sensor in the inner pressure chamber in communication with the controller, the pressure sensor being operable to measure the pressure of the pressurizable fluid supply in the inner pressure chamber, an auxiliary pressurized fluid supply to supplement the pressurizable fluid supply, and a pressure regulator responsive to the controller, the pressure regulator being operable to control the delivery of auxiliary pressurized fluid from the auxiliary pressurized fluid supply to the inner pressure chamber to maintain the pressure of the pressurizable fluid supply in the inner pressure chamber at or above a predetermined pressure level during evacuation of water from the apparatus, wherein the flow regulator comprises a sump located in the liquid passageway below the turbine and in which there is provided means to seal the sump, and wherein there is provided means to draw air from the sump thereby creating a vacuum in the sump.

2. A submersible hydroelectric generator apparatus as claimed in claim 1 in which there is provided a compressor to provide the auxiliary pressurized fluid supply.

3. A submersible hydroelectric generator apparatus as claimed in claim 1 in which the auxiliary pressurized fluid supply comprises air supplied from an existing process located remotely from the apparatus.

4. A submersible hydroelectric generator apparatus as claimed in claim 3 in which the auxiliary pressurized fluid supply comprises idle time air supplied from the existing process.

5. A submersible hydroelectric generator apparatus as claimed in claim 3 in which there is provided a tank located remotely from the submersible hydroelectric generator at the location of the existing process for storage of the auxiliary pressurized fluid supply, and a feed line extending from the tank to the submersible hydroelectric generator apparatus for delivery of the auxiliary pressurized fluid supply to the submersible hydroelectric generator apparatus.

6. A submersible hydroelectric generator apparatus as claimed in claim 1 in which the pressure regulator is operable to maintain the pressure of the pressurizable fluid supply in the inner pressure chamber at or above 1.8 bar.

7. A submersible hydroelectric generator apparatus as claimed in claim 6 in which the pressure regulator is operable to maintain the pressure of the pressurizable fluid supply in the inner pressure chamber below 3.0 bar.

8. A submersible hydroelectric generator apparatus as claimed in claim 1 in which the pressure regulator is operable to maintain the pressure of the pressurizable fluid supply in the inner pressure chamber at or above 2.0 bar.

9. A submersible hydroelectric generator apparatus as claimed in claim 1 in which there is provided a release valve in the inner pressure chamber to allow evacuation of at least some of the pressurizable fluid supply from the inner chamber.

10. A submersible hydroelectric generator apparatus as claimed in claim 9 in which there is provided a tank connected to the release valve to receive the pressurizable fluid supply evacuated from the inner pressure chamber.

11. A method of evacuating water from a submersible hydroelectric generator apparatus of the type claimed in claim 1 comprising the steps of:

providing an auxiliary pressurized fluid supply to supplement the pressurizable fluid supply in the inner pressure chamber during evacuation of water from the apparatus, controlling the delivery of auxiliary pressurized fluid from the auxiliary pressurized fluid supply to the inner pressure chamber to maintain the pressure of the pressurizable fluid supply in the inner pressure chamber at or above a predetermined pressure level, and when water is being discharged from the apparatus, sealing a sump located below the turbine and evacuating air from the sump, thereby creating a vacuum in the sump.

12. A method as claimed in claim 11 comprising the step of maintaining the pressure of the pressurizable fluid supply in the inner pressure chamber at or above 1.8 bar.

13. A method as claimed in claim 11 comprising the step of maintaining the pressure of the pressurizable fluid supply in the inner pressure chamber at or above 2.0 bar.

14. A method as claimed in claim 11 comprising the step of maintaining the pressure of the pressurizable fluid supply in the inner pressure chamber below 3.0 bar.

15. A method as claimed in claim 11 comprising the step of, when water is being discharged from the apparatus, limiting the flow of further incoming water through the apparatus.

16. A method as claimed in claim 11 comprising the step of harvesting pressurized air from an existing process for use as the auxiliary pressurized fluid supply.

* * * * *